(12) United States Patent
Xiao

(10) Patent No.: US 7,266,870 B2
(45) Date of Patent: Sep. 11, 2007

(54) MANDREL DEVICE FOR MACHINE TOOL

(76) Inventor: Alan Xiao, No. 12, Lane 63, Sec. 2, Liouchuan East Road, Taichung 40346 (TW)

( * ) Notice: Subject to any disclaimer, the term of this patent is extended or adjusted under 35 U.S.C. 154(b) by 0 days.

(21) Appl. No.: 11/329,516

(22) Filed: Jan. 11, 2006

(65) Prior Publication Data

US 2006/0156522 A1    Jul. 20, 2006

(30) Foreign Application Priority Data

Jan. 17, 2005    (TW) .............................. 94101302 A

(51) Int. Cl.
*B23B 27/00* (2006.01)
(52) U.S. Cl. .................... 29/27 C; 82/146; 409/231
(58) Field of Classification Search ........... 29/27 C; 82/146, 113, 152, 128, 46, 117, 131, 168, 82/154, 158, 159, 161; 408/153, 127, 128, 408/80, 81, 82; 409/15, 62, 203, 144, 215, 409/230, 231, 235
See application file for complete search history.

(56) References Cited

U.S. PATENT DOCUMENTS

| | | | | |
|---|---|---|---|---|
| 3,200,711 A | * | 8/1965 | Rogg ......................... 409/62 |
| 3,270,590 A | * | 9/1966 | Schneider .................... 82/152 |
| 3,617,143 A | * | 11/1971 | McKee ....................... 408/127 |
| 4,245,938 A | * | 1/1981 | Kriegl et al. ................. 409/15 |
| 4,807,501 A | | 2/1989 | Leigh et al. .................... 82/31 |
| 5,848,863 A | | 12/1998 | Liao ............................ 409/203 |
| 5,954,462 A | * | 9/1999 | Way et al. ................... 408/153 |
| 6,536,316 B2 | * | 3/2003 | Strait .......................... 82/113 |

* cited by examiner

*Primary Examiner*—Dana Ross
(74) *Attorney, Agent, or Firm*—Charles E. Baxley

(57) ABSTRACT

A mandrel device includes a spindle for rotatably attaching to a machine tool, a rotating device for selectively rotating the spindle, and a driving device for selectively driving the spindle in different speed or different torque when the rotating device do not rotate the spindle. The rotating device includes a motor coupled to or engaged with the spindle for rotating the spindle. A housing may be attached to the machine tool for rotatably supporting the spindle, and the motor may be disposed in the housing and engaged with the spindle. The driving device includes a gear attached to the spindle, a worm movable toward or away from the gear, and a motor coupled to the worm for rotating the spindle with the gear and the worm.

11 Claims, 6 Drawing Sheets

MANDREL DEVICE FOR MACHINE TOOL

BACKGROUND OF THE INVENTION

1. Field of the Invention

The present invention relates to a mandrel device, and more particularly to a mandrel device for attaching to various machine tools and for allowing the machine tools to selectively act as a lathe or a milling machine, or to be easily changed between a lathe and a milling machine.

2. Description of the Prior Art

Typical machine tools, such as lathe machines, milling machines, etc. comprise a mandrel device including a chuck device having three jaws for grasping and supporting a workpiece, a driving motor coupled to the mandrel device for rotating or driving the mandrel device and thus the workpiece, and one or more cutting tools or machining tools movable to work onto or machine the workpiece.

For example, U.S. Pat. No. 4,807,501 to Leigh et al. discloses one of the typical cutting tools or lathe machines and also comprises a chuck device including three jaws for grasping and supporting a workpiece, a quill for engaging with and for positioning the workpiece, a driving motor coupled to a mandrel device for rotating or driving a mandrel device and thus the workpiece, and one or more cutting tools or machining tools movable to work onto or machine the workpiece.

U.S. Pat. No. 5,848,863 to Liao discloses another typical working machine or milling machine and also comprises a chuck device for grasping and supporting a workpiece, and one or more cutting tools or machining tools movable to work onto or machine the workpiece.

In which, in the typical cutting tools or lathe machines, the mandrel device and the workpiece are required to be rotated in a great speed but with a less torque, however, in the typical working machine or milling machine, the mandrel device and the workpiece are required to be rotated in a reduced speed but with a great torque, such that the typical cutting tools or lathe machines may not be used or acted or worked as the typical working machine or milling machine, and the typical working machine or milling machine also may not be used or acted or worked as the typical cutting tools or lathe machines.

That is to say, the mandrel device and the workpiece of the typical machine tools may not be selectively rotated or driven either in a great speed but with a less torque or in a reduced speed but with a great torque, or may not be selectively rotated or driven by different driving devices and thus may not be used to conduct various kinds of machining operations.

The present invention has arisen to mitigate and/or obviate the afore-described disadvantages of the conventional mandrel devices for machine tools.

SUMMARY OF THE INVENTION

The primary objective of the present invention is to provide a mandrel device for attaching to various machine tools and for allowing the machine tools to selectively act as a lathe or a milling machine, or to be easily changed between a lathe and a milling machine.

The other objective of the present invention is to provide a mandrel device rotatable or drivable either in a great speed with a less torque or in a reduced speed with a great torque for conducting various kinds of machining operations.

The further objective of the present invention is to provide a mandrel device rotatable or drivable by different driving devices for conducting various kinds of machining operations.

In accordance with one aspect of the invention, there is provided a mandrel device comprising a spindle for rotatably attaching to a machine tool, a rotating device for selectively rotating the spindle, and a driving device for selectively driving the spindle in different speed or different torque when the rotating device do not rotate the spindle.

The rotating device includes a motor coupled to the spindle or engaged with the spindle for rotating the spindle. A housing may further be provided for attaching to the machine tool and for rotatably supporting the spindle. The motor may be selectively disposed in the housing and engaged with the spindle for rotating the spindle, or selectively disposed outside the housing and coupled to the spindle for rotating the spindle.

The driving device includes a gear attached to the spindle, a worm disposed beside the gear and selectively movable toward and to engage with the gear and selectively movable away from and disengaged from the gear, and a motor coupled to the worm for rotating the spindle with the gear and the worm.

The driving device includes a casing disposed beside the gear for rotatably supporting the worm. The driving device may include a housing for attaching to the machine tool and for pivotally supporting the casing. The housing includes an opening formed therein and aligned with the gear for rotatably or pivotally receiving the casing.

The casing may be pivotally attached to the housing with an axle. A moving device may further be provided for moving the casing toward or away from the gear and for selectively moving the worm toward and to engage with the gear or away from and disengaged from the gear. The spindle may include a chuck for grasping a workpiece.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
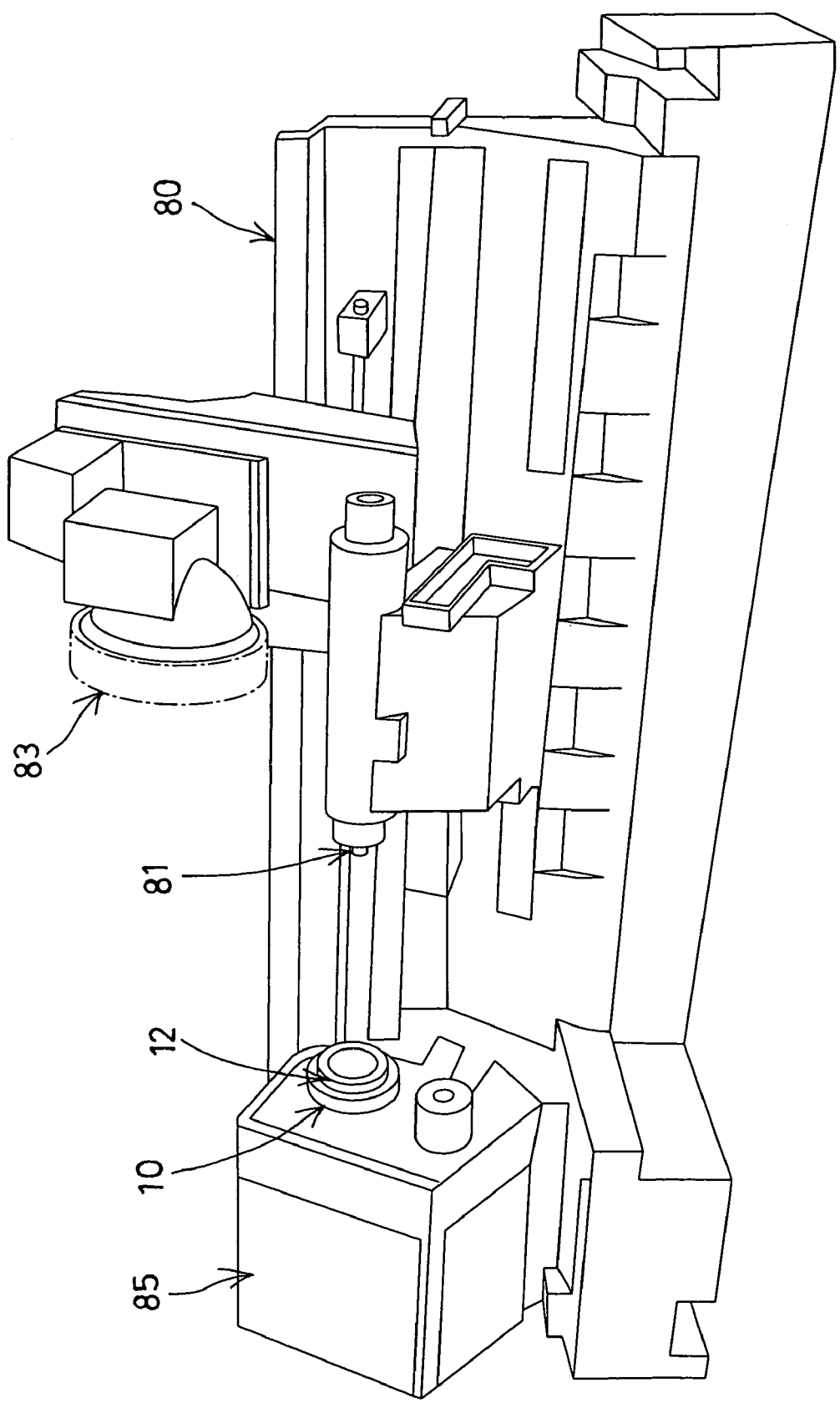
FIG. 1 is a perspective view illustrating a mandrel device for a machine tool in accordance with the present invention.
Figure 2:
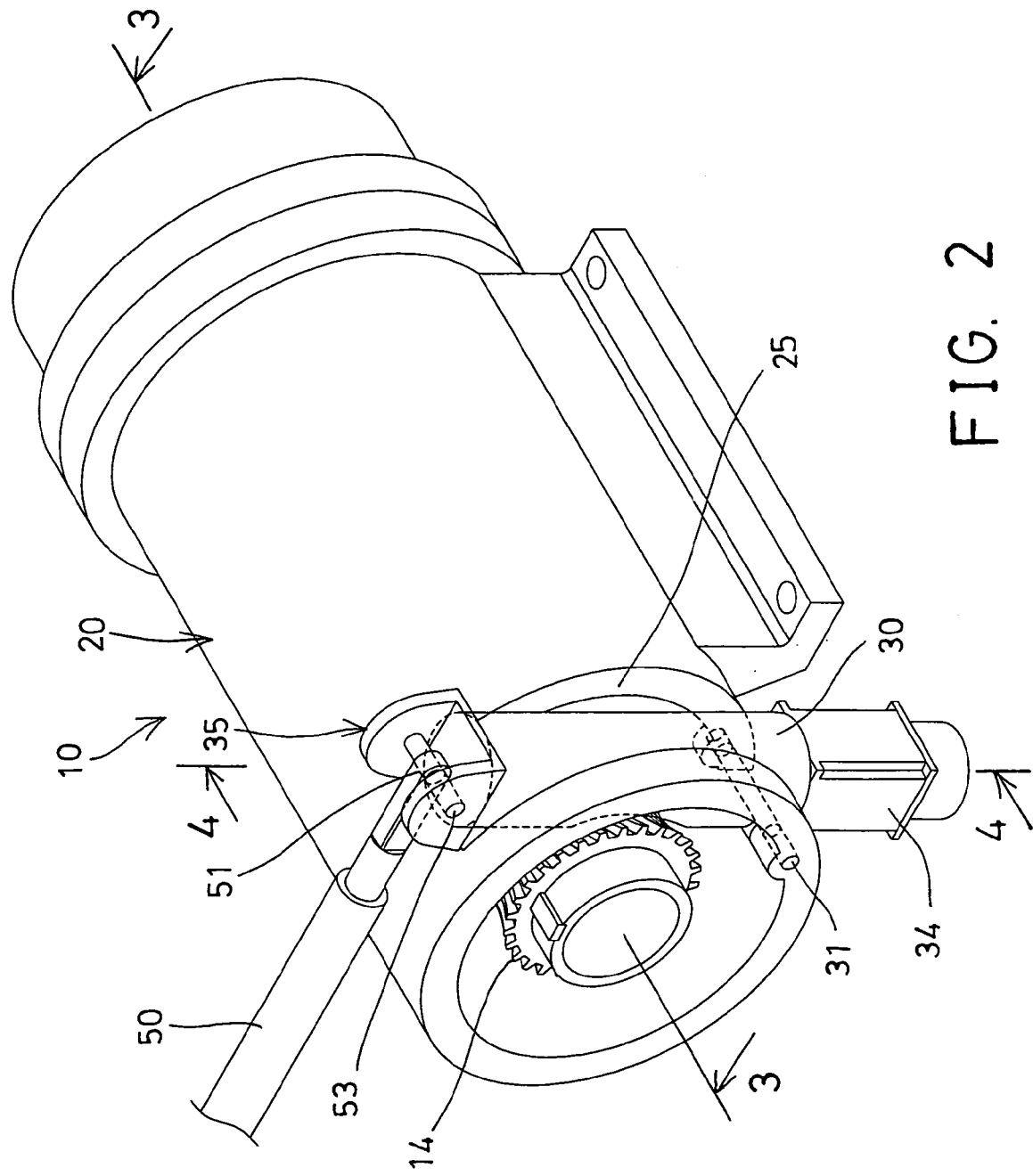
FIG. 2 is an enlarged partial perspective view of the mandrel device.
Figure 3:
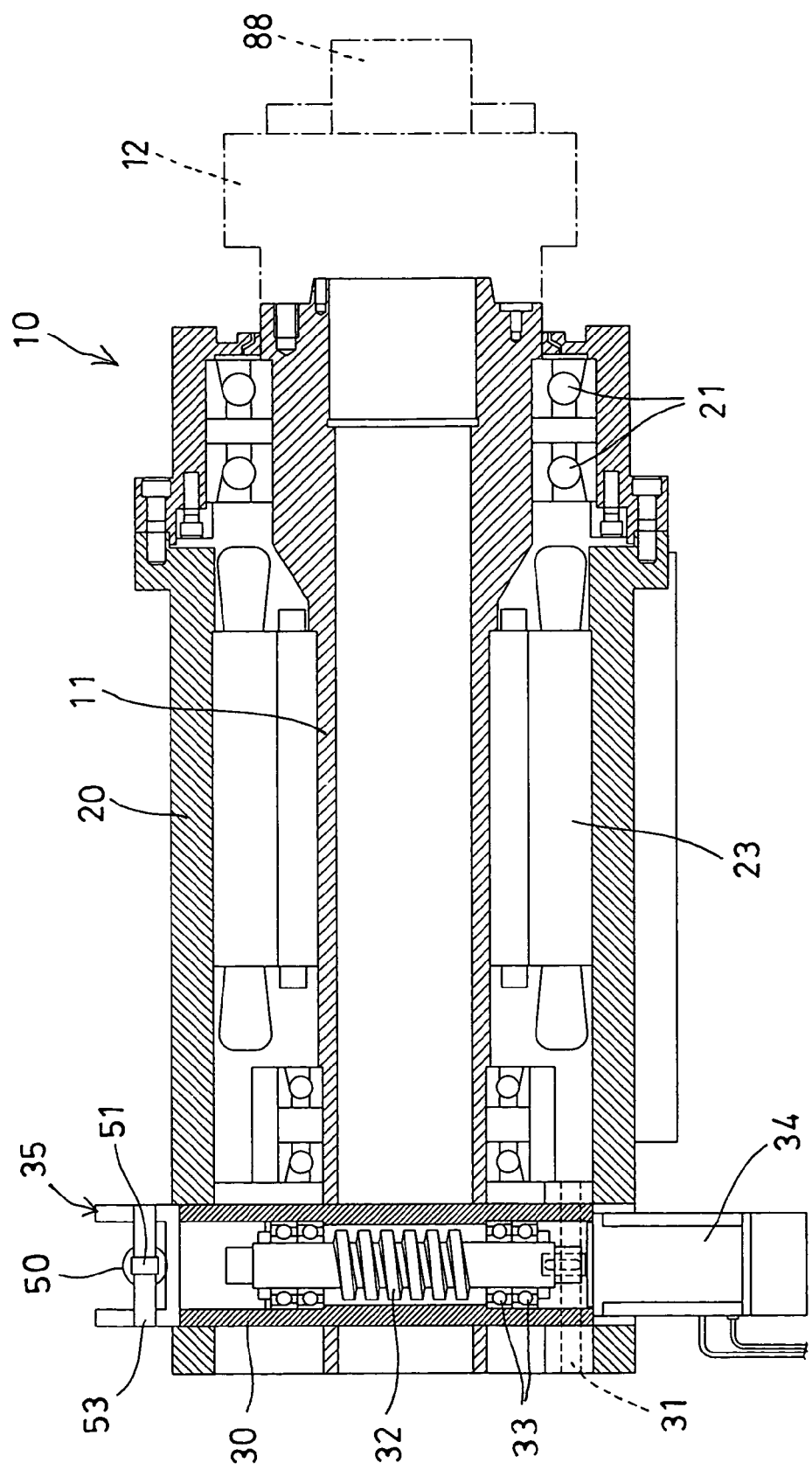
FIG. 3 is a partial cross sectional view of the mandrel device, taken along lines 3-3 of FIG. 2.

Referring to the drawings, and initially to FIGS. 1-3, a mandrel device 10 in accordance with the present invention is provided for attaching or engaging into a machine tool 80, such as cutting machines, lathe machines, milling machines, or other working machines, and comprises a spindle 11, a chuck 12 attached to one end of the spindle 11 and having typical grasping pawls (not shown) for grasping and supporting workpieces 88 (FIGS. 3, 6) to be machined or worked by the machine tool 80. The machine tool 80 may further include a center or quill 81 for engaging with and for positioning the workpiece 88, and one or more cutting tools or machining tools 83 operatable to work onto or to machine the workpiece 88.

The mandrel device 10 may selectively include an outer housing 20 supported or disposed in a stand or headstock 85 of the machine tool 80 (FIG. 1) for rotatably supporting the spindle 11, or the spindle 11 may be rotatably supported or engaged in the housing 20 with one or more bearings 21 (FIG. 3). A rotating means or device 23, such as a motor 23 and particularly an induction motor 23 may be disposed in the housing 20 and engaged with the spindle 11 for selectively rotating or driving the spindle 11, such as for rotating or driving the spindle 11 in such as a great speed with a less torque and for conducting such as cutting or lathing or other machining operations.

Figure 6:
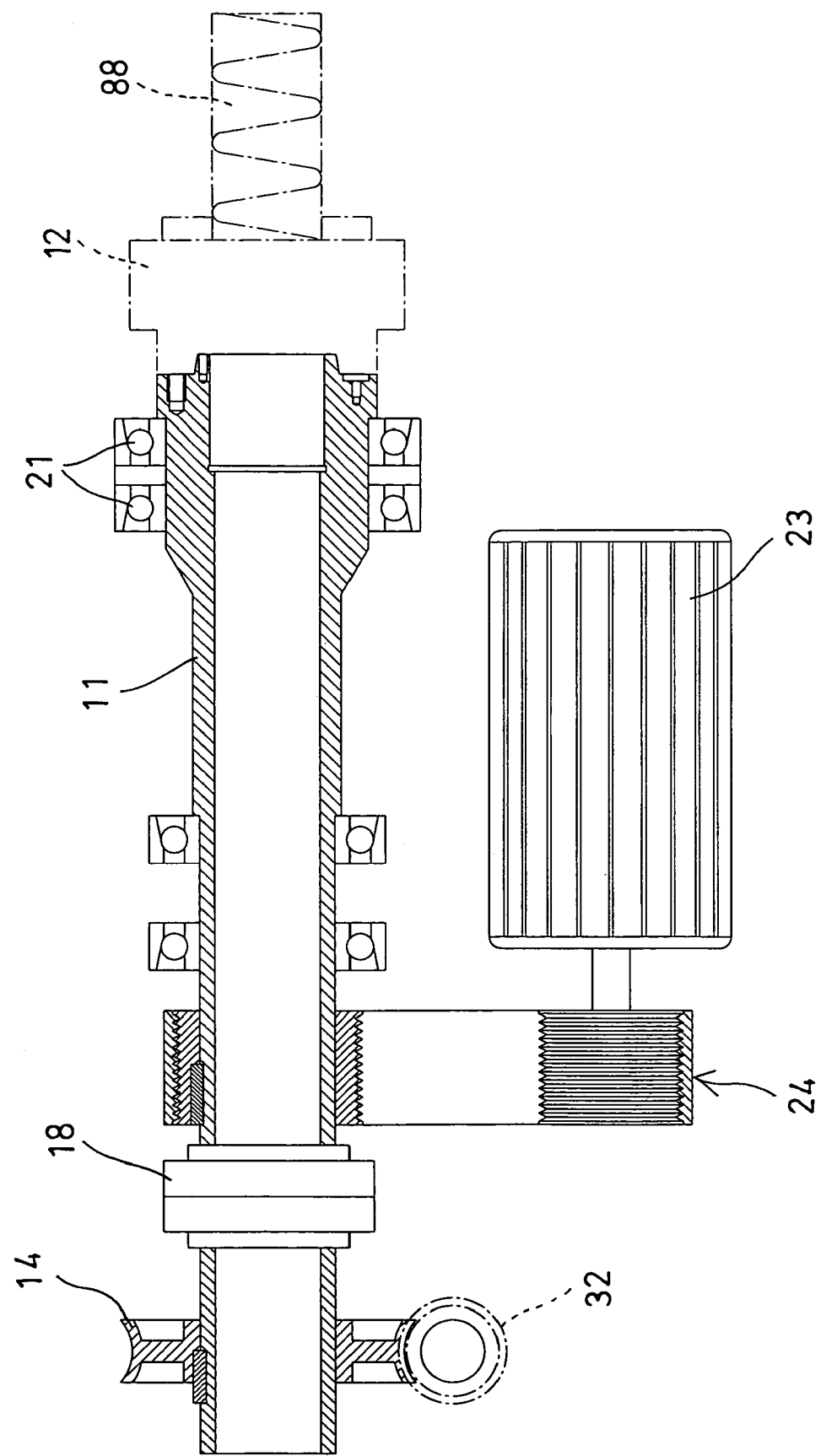
FIG. 6 is a partial cross sectional view similar to FIG. 3, illustrating the other arrangement of the mandrel device for the machine tool.

Alternatively, as shown in FIG. 6, the spindle 11 may also be directly and rotatably supported or engaged in the headstock 85 of the machine tool 80 with one or more bearings 21, and further alternatively, the motor 23 may also be disposed in the machine tool 80 and coupled to the spindle 11 with a coupling device 24, such as a pulley-and-belt coupling device 24, a sprocket-and-chain coupling device 24, a gearing coupling device 24, a bolt-and-nut coupling device 24, for rotating or driving the spindle 11 in such as the great speed with the less torque. Accordingly, the motor 23 may be used as a rotating means or device 23 to rotate or to drive the spindle 11 in the great speed with the less torque.

The mandrel device 10 includes a pinion or gear 14, such as a worm gear 14 (FIGS. 2 and 4-5) attached or secured onto the spindle 11 and rotated in concert with the spindle 11. As best shown in FIG. 2, the housing 20 include an opening 25 formed therein and preferably aligned with the worm gear 14, for receiving a casing 30, such as a cylindrical casing 30. For example, the casing 30 is received in the opening 25 of the housing 20 and rotatably or pivotally attached to the housing 20 with an axle 31, for allowing the casing 30 to be rotatably or pivotally disposed beside the housing 20 and to be rotated relative to the housing 20 and for allowing the casing 30 to be moved toward or away from the worm gear 14.

Figure 4:
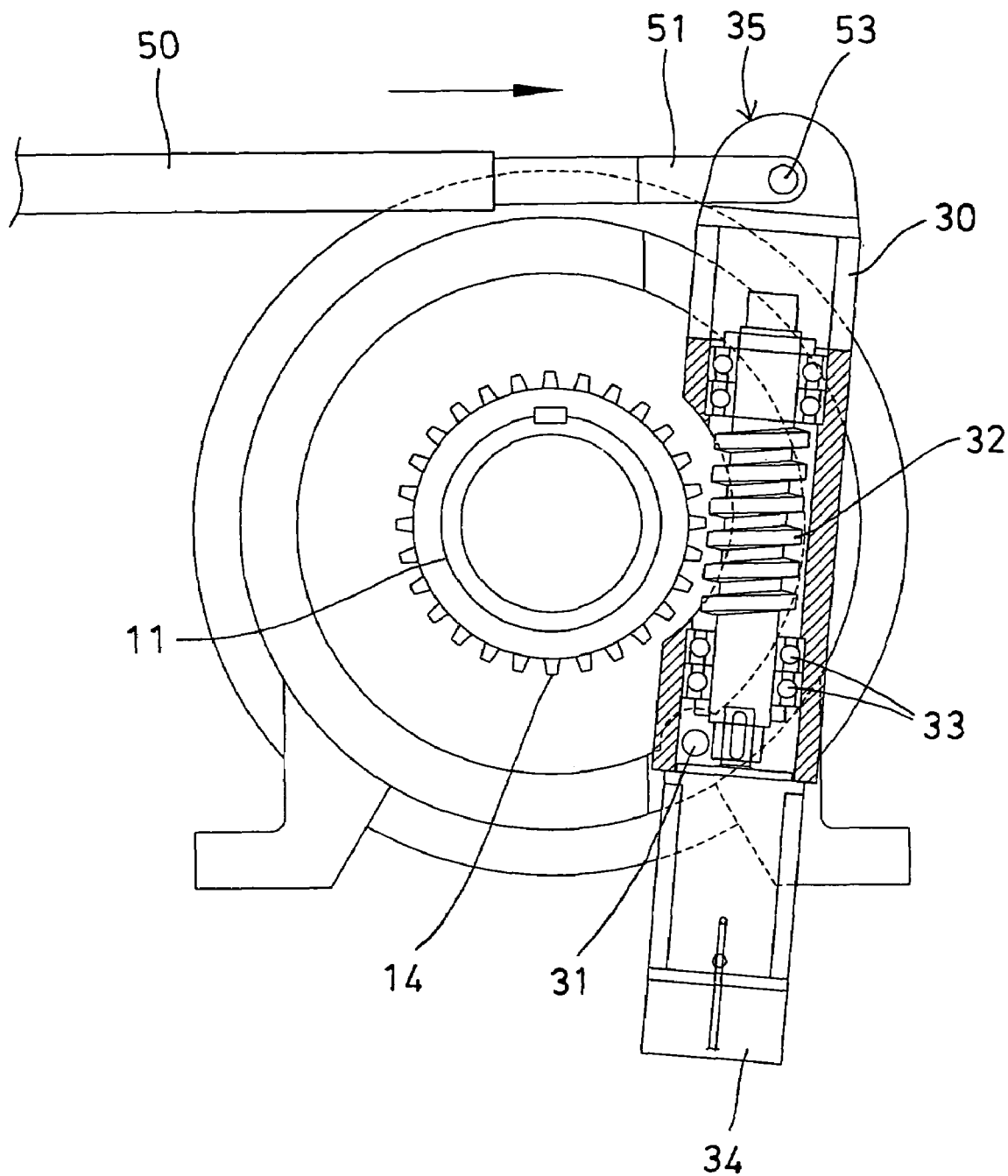
FIG. 4 is a partial cross sectional view of the mandrel device, taken along lines 4-4 of FIG. 2.

A worm 32 is rotatably received or engaged within the casing 30 with one or more bearings 33 (FIGS. 3-5) or disposed beside the worm gear 14, and movable relative to the housing 20 and the spindle 11 and the worm gear 14, for allowing the worm 32 to be selectively moved toward and to engage with the worm gear 14 (FIG. 5) by moving the casing 30 toward the worm gear 14, or for allowing the worm 32 to be selectively moved away from and disengaged from the worm gear 14 (FIG. 4). For example, when the worm 32 is moved away from and disengaged from the worm gear 14 (FIG. 4), the spindle 11 and the workpiece 88 may be rotated or driven in the great speed and the less torque by either of the motors 23 as shown in FIG. 3 or 6.

Figure 5:
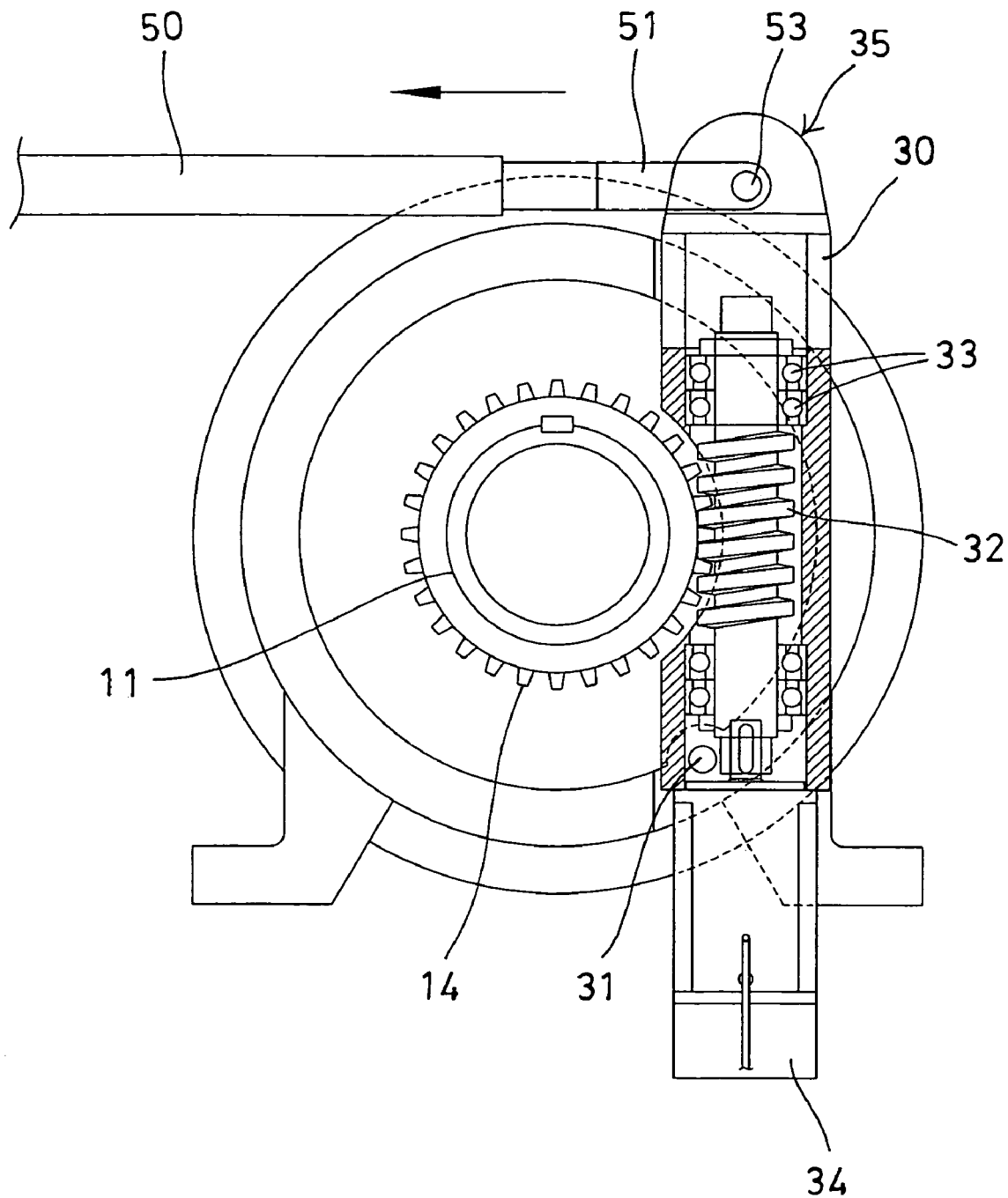
FIG. 5 is a partial cross sectional view similar to FIG. 4, illustrating the operation of the mandrel device.

A rotating or driving means or device 34, such as a step or servo motor 34 is further provided and attached to such as the housing 20 and coupled to the worm 32 for rotating or driving the worm 32 to selectively rotate or drive the spindle 11 when the worm 32 is engaged with the worm gear 14 (FIG. 5). For example, the driving device or motor 34 may be used for rotating or driving the spindle 11 in a reduced speed and a great torque by the worm 32 and the worm gear 14, for conducting such as milling or other machining operations. Accordingly, the motor 34 may be used as a driving means or device 34 to rotate or to drive the spindle 11 in the reduced speed and the great torque.

A moving or actuating means or device 50, such as a pneumatic or hydraulic cylinder 50, an electromagnetic valve device 50, a motor-driven-bolt device 50 or the like is disposed or attached to such as the headstock 85 of the machine tool 80 and includes an extension or movable member 51 pivotally coupled to an upper or free end portion 35 of the casing 30 with such as a pivot pin 53, for moving the casing 30 toward or away from the worm gear 14 and thus for selectively moving the worm 32 toward and to engage with the worm gear 14 (FIG. 5), or away from and disengaged from the worm gear 14 (FIG. 4).

In operation, as shown in FIGS. 2 and 4, when the worm 32 is moved away from and disengaged from the worm gear 14 by the moving means or device 50, the spindle 11 and the workpiece 88 may be rotated or driven in the great speed and the less torque by either of the motors 23 as shown in FIGS. 3 or 6. As shown in FIGS. 5 and 6, the worm 32 may be selectively moved toward and to engage with the worm gear 14 by moving the casing 30 toward the worm gear 14, for allowing the spindle 11 to be selectively rotated or driven in the reduced speed and the great torque by the driving device or motor 34 via the worm 32 and the worm gear 14, when the spindle 11 and the workpiece 88 are not rotated or driven by the motors 23.

As shown in FIG. 6, the spindle 11 may be directly and rotatably supported or engaged in the headstock 85 of the machine tool 80 and coupled to the motor 23 with the coupling device 24, for allowing the spindle 11 to be selectively rotated or driven in the great speed and the less torque by the rotating device or motor 23. In this arrangement, the worm gear 14 may be coupled to the spindle 11 via such as a clutch device 18 for allowing the worm gear 14 to be selectively coupled to and rotated in concert with the spindle 11 or to be selectively disengaged from the spindle 11.

It is to be noted that the spindle 11 of the typical machine tools may only be rotated or driven in one speed by the rotating device or motor 23, but may not be selectively rotated or driven by another driving device or motor 34, such that the spindle 11 of the typical machine tools may not be rotated or driven in different speeds by different rotating or driving devices or motors 23, 34. The workpieces 88 may thus be easily and readily rotated or driven in different speeds and different torques by either of the motors 23, 34 without being disengaged and changed to the other mandrel device 10 of the other machine tools.

Accordingly, the mandrel device in accordance with the present invention may be provided for attaching to various machine tools and for allowing the machine tools to selectively act as a lathe or a milling machine, or to be easily changed between a lathe and a milling machine, and the mandrel device is rotatable or drivable either in a great speed with a less torque or in a reduced speed with a great torque for conducting various kinds of machining operations.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A mandrel device comprising:
   a spindle for rotatably attaching to a machine tool,
   means for selectively rotating said spindle, and means for selectively driving said spindle when said rotating means do not rotate said spindle, said driving means including a gear attached to said spindle, a worm disposed beside said gear and selectively movable toward and to engage with said gear and selectively movable away from and disengaged from said gear, and a motor coupled to said worm for rotating said spindle with said gear and said worm.

2. The mandrel device as claimed in claim 1, wherein said rotating means includes a motor coupled to said spindle for rotating said spindle.

3. The mandrel device as claimed in claim 1, wherein said rotating means includes a motor engaged with said spindle for rotating said spindle.

4. The mandrel device as claimed in claim 3 further comprising a housing for attaching to the machine tool and for rotatably supporting said spindle.

5. The mandrel device as claimed in claim 4, wherein said motor is disposed in said housing and engaged with said spindle for rotating said spindle.

6. The mandrel device as claimed in claim 1, wherein said driving means includes a casing disposed beside said gear for rotatably supporting said worm.

7. The mandrel device as claimed in claim 6, wherein said driving means includes a housing for attaching to the machine tool and for pivotally supporting said casing.

8. The mandrel device as claimed in claim 7, wherein said housing includes an opening formed therein and aligned with said gear for receiving said casing.

9. The mandrel device as claimed in claim 7, wherein said casing is pivotally attached to said housing with an axle.

10. The mandrel device as claimed in claim 6 further comprising means for moving said casing toward or away from said gear and for selectively moving said worm toward and to engage with said gear or away from and disengaged from said gear.

11. The mandrel device as claimed in claim 1, wherein said spindle includes a chuck for grasping a workpiece.

* * * * *